United States Patent
Matsubara et al.

(10) Patent No.: US 12,467,698 B2
(45) Date of Patent: Nov. 11, 2025

(54) THERMAL CRACKING TUBE WITH FLUID AGITATING ELEMENT

(71) Applicant: KUBOTA CORPORATION, Osaka (JP)

(72) Inventors: Motoyuki Matsubara, Hirakata (JP); Kunihide Hashimoto, Hirakata (JP)

(73) Assignee: KUBOTA CORPORATION, Osaka (JP)

( * ) Notice: Subject to any disclaimer, the term of this patent is extended or adjusted under 35 U.S.C. 154(b) by 800 days.

(21) Appl. No.: 17/783,454

(22) PCT Filed: Dec. 23, 2020

(86) PCT No.: PCT/JP2020/048116
§ 371 (c)(1),
(2) Date: Jun. 8, 2022

(87) PCT Pub. No.: WO2021/132310
PCT Pub. Date: Jul. 1, 2021

(65) Prior Publication Data
US 2023/0019289 A1    Jan. 19, 2023

(30) Foreign Application Priority Data
Dec. 27, 2019    (JP) .................. 2019-237855

(51) Int. Cl.
*F28F 1/40*    (2006.01)
*C10G 9/20*    (2006.01)

(52) U.S. Cl.
CPC . *F28F 1/40* (2013.01); *C10G 9/20* (2013.01)

(58) Field of Classification Search
CPC .......... B01F 25/00; B01F 25/40; B01F 25/42; B01F 25/43; B01F 25/431; B01F 25/4314;
(Continued)

(56) References Cited

U.S. PATENT DOCUMENTS 1,887,155 A    11/1932    Harnsberger
6,883,597 B2 *    4/2005    Thors .................. F28F 1/40
                                         165/184
(Continued)

FOREIGN PATENT DOCUMENTS

EP          0692693 A2 *  1/1996  ............... F28F 1/40
JP    SHO 61-289293         12/1986
(Continued)

OTHER PUBLICATIONS

European Patent Office "extended European search report" for corresponding European Patent Application No. 20905201.8, dated Jan. 8, 2024, 10 pp.
(Continued)

*Primary Examiner* — Natasha E Young
(74) *Attorney, Agent, or Firm* — Eckert Seamans Cherin & Mellott, LLC

(57) ABSTRACT

The present invention provides a thermal cracking tube having the effect of agitating a fluid in the tube and capable of preventing overheating due to the generation of laminar flow, wherein the thermal cracking tube 10 has an agitating element 20 formed on and projecting inwardly from an inner surface of the tube, wherein the fluid agitating element comprises a fin 21 extending along the inner surface of the tube and bumps 24 provided on a region near the fin and projecting inwardly from the inner surface of the tube, wherein the region near the fin includes an upstream side and/or a downstream side of the fin in the direction of the fluid flowing through the tube.

10 Claims, 5 Drawing Sheets

(58) Field of Classification Search
CPC ............ B01F 25/43141; B01F 25/4317; B01F 25/43172; B01F 25/43197; B01F 25/431971; B01J 2219/00; B01J 2219/00761; B01J 2219/00763; B01J 2219/00765; B01J 2219/0077; B01J 2219/00772; C10G 9/00; C10G 9/14; C10G 9/16; C10G 9/18; C10G 9/20; F28D 2021/00; F28D 2021/0019; F28D 2021/0075; F28F 1/00; F28F 1/10; F28F 1/40

See application file for complete search history.

(56) References Cited

U.S. PATENT DOCUMENTS

| | | |
|---|---|---|
| 2002/0195233 A1 | 12/2002 | Thors et al. |
| 2006/0102327 A1 | 5/2006 | Inui et al. |
| 2010/0143206 A1 | 6/2010 | Hashimoto |
| 2014/0083668 A1 | 3/2014 | Deng |
| 2014/0223956 A1 | 8/2014 | Lee et al. |

FOREIGN PATENT DOCUMENTS

| | | |
|---|---|---|
| JP | HEI 2-280933 | 11/1990 |
| JP | HEI 11-285764 | 10/1999 |
| JP | 2004-524502 A | 8/2004 |
| JP | 2008-249249 A | 10/2008 |
| JP | 2014-507626 A | 3/2014 |
| WO | 2004/046277 A1 | 3/2004 |
| WO | 2013/046482 | 4/2013 |

OTHER PUBLICATIONS

Japan Patent Office "International Search Report" for corresponding International application No. PCT/JP2020/048116, mailed Feb. 9, 2021, 6 pp.

* cited by examiner

F I G. 7
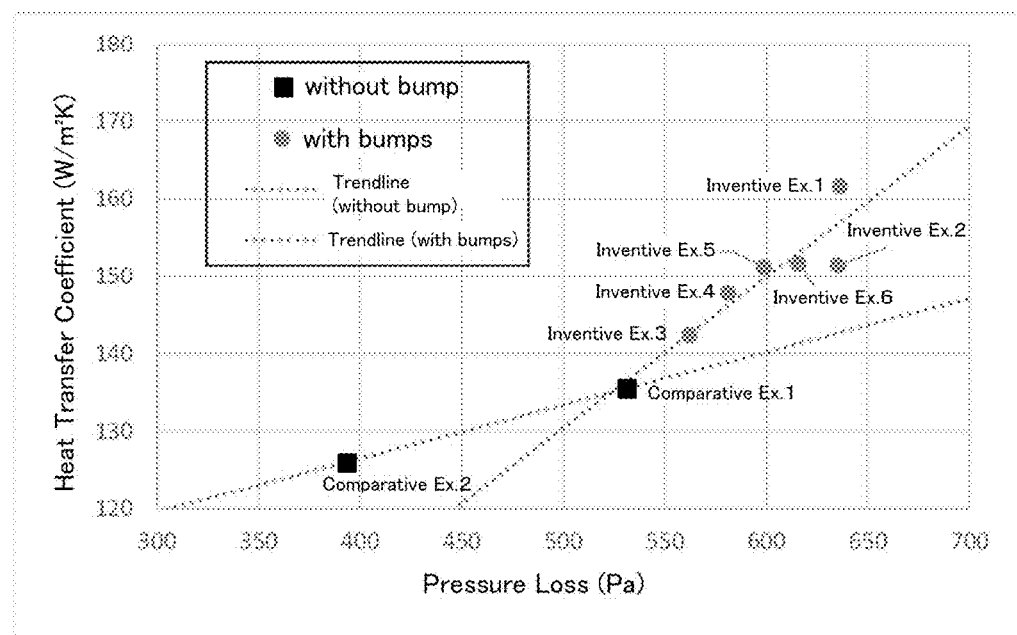

THERMAL CRACKING TUBE WITH FLUID AGITATING ELEMENT

This application is a U.S. National Stage Entry of International Patent Application Serial Number PCT/EP2020/048116, now WO 2021/110809, filed Dec. 23, 2020, which claims priority to Japanese Patent Application No. JP2019-237855, filed Dec. 27, 2019, the entire contents of all of which are incorporated herein by reference.

TECHNICAL FIELD

The present invention relates to a thermal cracking tube used for a thermal cracking reaction furnace for producing, for example, ethylene, and more specifically, relates to a thermal cracking tube with an agitating element wherein it protrudes from an inner surface of the tube and is configured to enhance an agitation action of a fluid flowing through the cracking tube.

BACKGROUND ART

Olefin, such as ethylene and propylene, is produced by passing a feedstock fluid material containing hydrocarbon (such as naphtha, natural gas, ethane, etc.) at high speed through a thermal cracking tube heated from outside while heating the feedstock fluid material to a reaction temperature range and subjecting the heated material to the thermal cracking process.

For an efficient thermal cracking reaction, it is essential to heat the feedstock flowing at high speed to reach the reaction temperature range at the center in the radial direction of the cracking tube passage in a short period of time and avoid excessive heating as much as possible. The excessive heating of the feedstock fluid material leads to a lightening of hydrocarbons to produce methane, free carbon, etc., and causes a polycondensation reaction of thermally decomposed products, resulting in a decrease of the yield of the target product. In addition, coking (deposition of free carbon on an inner surface of the tube) is facilitated so that the heat transfer coefficient of the tube body declines. In this case, decoking works are required to perform more frequently, which causes a decrease in operating hours.

In the prior art, a thermal cracking tube is formed on an inside surface thereof with fins as an agitating element for agitating the feedstock (for example, see Patent Document 1). The fins disclosed in Patent Document 1 are formed helically around an axis of the tube. The fins serve to agitate the feedstock fluid material flowing at high speed to enhance the heat transfer of the tube, whereby the fluid material is heated rapidly, and the thermal cracking process is complete in a short period of time. This reduces excessive cracking and coking caused by overheating. In addition, the improved heat transfer efficiency of the thermal cracking tube contributes to lowering the heating temperature of the thermal cracking tube, thus extending the service life of the thermal cracking tube.

PRIOR ART DOCUMENT(S)

Patent Document(s)

Patent Document 1: JP Patent Application Publication 2008-249249

SUMMARY OF THE INVENTION

Problems to be Solved by the Invention

There is a demand to further improve the heat transfer efficiency of the thermal cracking tube. The fluid is agitated by the fins and is distributed along the inner surface of the tube in the region where the fins are not formed, so that a boundary film may be produced on the inner surface of the tube. Laminar flow is generated on the boundary film region and is not sufficiently replaced with the fluid circulating on the inner surface side of the tube, leading to overheating of the fluid.

An object of the present invention is to provide a thermal cracking tube that increases an agitating effect on the fluid flowing through the cracking tube, and prevents the fluid from overheating by the generation of the laminar flow.

Means to Overcome the Problems

A thermal cracking tube according to the present invention, wherein the thermal cracking tube is provided on an inner surface thereof with one or more fluid agitating elements extending inwardly from the inner surface of the tube, the agitating element comprising
a fin formed extending along the inner surface of the tube, and
bumps provided on a region near the fin and projecting inwardly from the inner surface of the tube.

The term "region near the fin" preferably includes the upstream side and/or downstream side of the fin in the direction of the fluid flowing through the tube.

The bumps are preferably random in shape which are not constant with respect to height and/or size.

The height H1 of the fin is preferably higher than the height H2 of the bumps.

The fin may comprise a plurality of fins formed on the inner surface of the tube at an interval of I, wherein the bumps are provided preferably in the region up to I/2 of the upstream side and/or of the downstream side of the fin.

An area S between the fin and the fin on the tube inner surface is preferably at least twice larger than an area S' occupied by bumps on the tube inner surface.

The bumps may be point-like protrusions projecting inwardly from the inner surface of the tube.

The bumps are preferably formed at least on the downstream side of the fin.

The fin is preferably formed helically relative to an axis of the tube.

Effect of the Invention

With the thermal cracking tube of the present invention, the fluid is subjected to agitation by the fin. In addition, the bumps formed on the inner surface of the tube serve to agitate the fluid flowing near the inner surface of the tube, thus preventing laminar flow from occurring near the inner surface of the tube. This prevents overheating and increases the heat transfer efficiency while providing the agitating effect. Therefore, the yield of olefin is enhanced, and the coking decreases due to excessive decomposition.

BRIEF DESCRIPTION OF THE DRAWINGS

FIG. 7 is a graph showing the relationship between pressure loss and heat transfer efficiency of the Second Example.

EMBODIMENT FOR CARRYING OUT THE INVENTION

Figure 1:
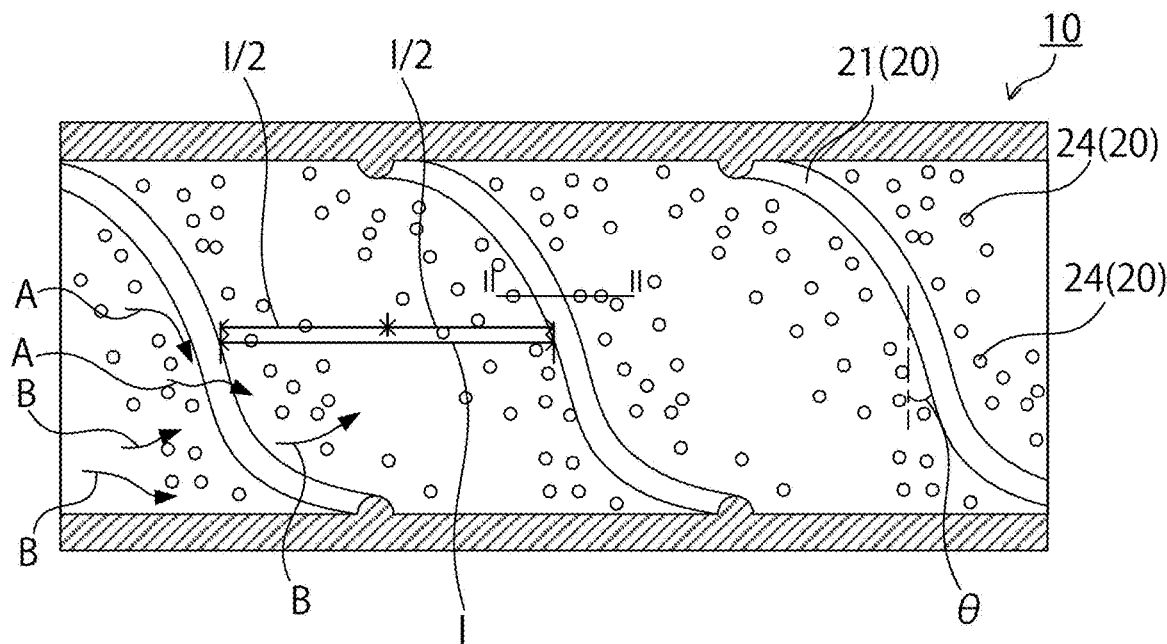
FIG. 1 is a development view of the thermal cracking tube formed with an agitating element, according to an embodiment of the present invention.

Thermal cracking tube 10 according to the present invention will be explained with reference to the drawings. Thermal cracking tube 10 illustrated in the drawing is a straight tube, and is generally formed in a spiral shape by connecting the straight tube to the straight tube with a bend tube and then installed in a thermal cracking furnace. Thermal cracking tube 10 is heated from outside the tube to thermally decompose the feedstock fluid material flowing through the cracking tube.

Figure 2:
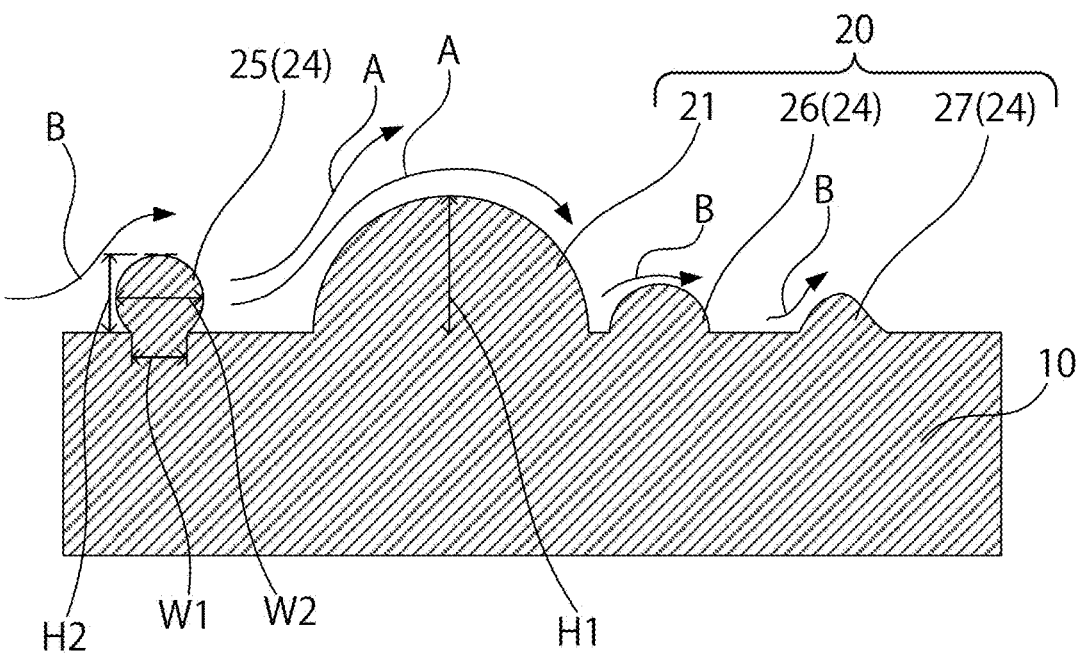
FIG. 2 is a sectional view taken along line II-II in FIG. 1.

FIG. 1 is a development view of the thermal cracking tube 10 showing an embodiment of the present invention. FIG. 2 is an enlarged sectional view taken along line II-II in FIG. 1. For the convenience of explanation, the left side of the paper in FIG. 1 refers to as the upstream side and the right side refers to as the downstream side of the direction of fluid flow.

The cracking tube 10 can be made of a heat-resistant alloy material, such as 25Cr—Ni (SCH22), 25Cr-35Ni (SCH24), Incoloy (trademark name), and an alloy containing Al in an amount of 6.0 mass % as the upper limit. However, the material for making the thermal cracking tube 10 is not limited to them, and may be other kinds of heat-resistant alloy materials that can endure in the use under a high-temperature environment and provide the performance as required.

The cracking tube 10 is formed on an inner surface thereof with an agitating element 20 projecting inwardly from the inner surface. More specifically, the agitating element 20 may comprise a fin 21 and bumps 24 on a region near the fin 21 of the tube inner surface.

The fin 21 constituting the agitating element 20 shown in FIG. 1 extends in a continuously helical pattern. When an angle of the fin 21 inclined from the upstream to the downstream relative to a surface orthogonal to the tube axis is referred to as θ, the inclined angle θ may be constant or different over the upstream to the downstream of thermal cracking tube 10. For example, the inclination angle θ of fin 21 is preferably up to 85°, more preferably up to 30°. The inclination angle θ of the fin 21 is preferably at least 15°. The fin 21 may be θ=0, i.e., orthogonal to the tube axis. If the inclination angle is smaller, stagnation of the fluid is more likely to occur on the downstream side of fin 21. On the other hand, when the inclination angle of the fin 21 is smaller, the inclination angle of the fin 21 becomes larger, improving effects such as agitation and turbulent flow of the fluid flowing through the cracking tube.

Figure 3:
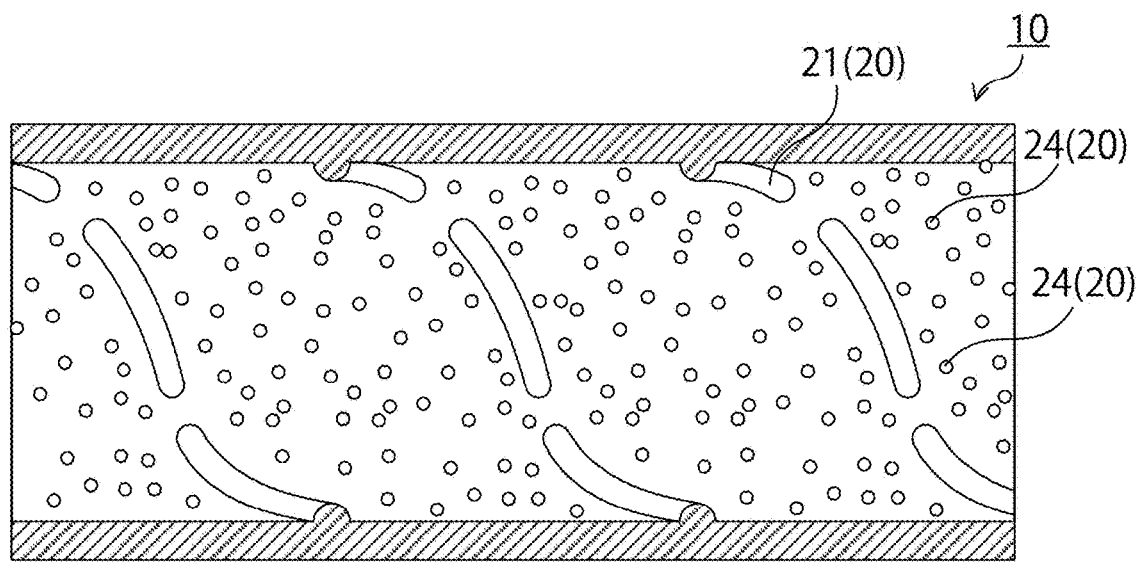
FIG. 3 is a development view of the thermal cracking tube formed with a different shaped fin.

The fin 21 may be formed in an intermittent configuration, as illustrated in FIG. 3.

The distance I between the fins 21 may be about 20 to 400 mm for the cracking tube having an inner diameter of 30 to 150 mm. The fin 21 shown in FIGS. 1 and 3 is in a single helical line, but may be in a plurality of helical lines arranged in parallel or in different inclination angles.

A height (H1) of the fin 21 is preferably about 1/60 to 1/10 of the inner diameter of the cracking tube. If the height (H1) of the fin 21 is lower than 1/60 of the tube inner diameter, there may not be able to fully provide the agitating and turbulent flow effects of the fluid. If the height (H1) of the fin 21 is higher than 1/10 of the tube inner diameter, the fin 21 inhibits the fluid flow and increases the pressure loss. In addition, the fluid is likely to accumulate on the downstream side of the fin 21, resulting in leading to excessive cracking and deposition of the coke. Therefore, the height (H1) of the fin 21 is set as described above.

The fin 21 can be made of the same heat-resistant alloy material as those of the above-described thermal cracking tube 10, but the material is not limited to them.

The fin 21 can be suitably formed as a build-up bead by build-up welding methods, such as powder plasma welding (PTA welding), MIG welding, TIG welding, and laser welding. Thermal cracking tube 10 and the fin 21 may be integrally manufactured by extrusion processing or can be formed by machining, such as cutting.

Bumps 24 are provided on a region near the fin 21. This region includes the upstream side and downstream side of the fin 21. The bumps 24 may not be evenly distributed over the entire inner surface of the tube, but can be concentrated in a band-like area having a predetermined distance away from the upstream and downstream of the fin 21, as shown in FIG. 1. Of course, the bumps 24 can be evenly distributed on the inner surface of the tube, as shown in FIG. 3. If the fin 21 is provided in an intermittent form, as shown in FIG. 3, the above-mentioned region near the fin may include a region between fin 21 and fin 21.

In the embodiment wherein the bumps 24 are provided on the upstream and/or downstream sides of the fin 21 and the distance between the fins 21 is indicated as "I," the bumps 24 are positioned on the region I/2 upstream and I/2 downstream from the fin 21, and preferably on the region I/3 upstream and I/3 downstream. This arrangement prevents the fluid toward the fin 21 from generating the laminar flow and prevents the fluid agitated by the fin 21 from generating the laminar flow again.

The area S where bumps 24 are formed between fin 21 and fin 21 on the tube inner surface (i.e., an area excluding fin 21) is preferably at least twice as large as the area S' occupied by the bumps 24 on the tube inner surface. In other words, the area S' occupied by bumps 24 is preferable to be up to I/2 of the area S between fin 21 and fin 21. The bumps 24 should not be positioned densely on the inner surface of the tube but should be sparsely arranged, leaving some space between them, thereby effectively agitating the fluid, reducing fluid stagnation between bumps 24, 24, and reducing a buildup of coke. The value of S'/S is preferably 20% or less, more preferably 10% or less, and most preferably 6% or less.

The bumps 24 can be a granularly raised shape 25 like a sectional configuration shown in FIG. 2, a shape 26 hemispherically raised from the inner surface of the thermal cracking tube 10, or a shape 27 smoothly mountainously raised from the inner surface of the thermal cracking tube 10. When bump 24 has the granularly raised shape 25, the maximum diameter W2 of the bump 24 is larger than the contact width W1 between bump 24 and the inner surface of the pipe, as shown in FIG. 2. As a result, the surface area of bump 24 can be made larger, and the heat exchange efficiency can be improved. The shape of bump 24 viewed from the tube axis side may be a point-like, circle-like, oval-like, square-like, or any other form, and of course, may be in combination of these forms. The shapes of bump 24 are made preferably random rather than constant, because when the fluid collides with the bumps 24, the fluid flow becomes complex and breaks boundary films, thus increasing the effect of preventing the laminar flow from generating.

The height H1 of the fin 21 is preferably higher than the height H2 of the bump 24, i.e., H1>H2, as shown in FIG. 2. The height H1 of the fin 21 is more preferably twice or more than the height H2 of the bump 24 (H1≥H2). This reason is that fin 21 is essentially to agitate the fluid, and bumps 24 are to prevent the laminar flow from generating. By making the height of the bumps random, the fluid flow produced by each of the bumps 24 becomes more complex, and the boundary film breaks, so that the effect of preventing the laminar flow from generating is enhanced.

The bumps 24 also can be made of the same heat-resistant alloy material as those of the above-described thermal cracking tube 10 and the fin 21, but the material is not limited to them.

The bumps 24 can be provided on an inner surface of the tube, for example, by sputtering. The bumps can be arranged in a point-like form on the inner surface of the tube also by TIG welding, MIG welding, laser welding, and so on. When the fin 21 is formed by an overlay welding method such as powder plasma welding (PTA welding), shielding gas such as argon gas is injected into the tube to prevent oxidation of the inner surface of the tube and the molten metal of the build-up welding powder. In this case, point-like or granular bumps 24 can be formed, for example, by increasing the flow rate and flow volume of argon gas and scattering part of the molten powder of the build-up welding on the inner surface of the tube. The point-like or granular bumps 24 can also be formed by increasing the flow rate and flow volume of a feed gas of the build-up welding powder supplied when welding and scattering part of the molten powder injected from the nozzles on the inner surface of the tube.

As mentioned above, the thermal cracking tube 10 has an agitating element 20 that comprises a fin 21 and bumps 24 provided on the periphery portion of the fin 21. When a fluid is introduced into this thermal cracking tube 10, the fluid is agitated by the fin 21 and becomes a spiral flow along the fin 21 or a flow over the fin 21, as shown by arrow A in FIGS. 1 and 2. Since the fluid can be agitated to the center portion in the radial direction of the tube, the fluid temperature is quickly heated up. In addition, the fluid collides with bumps 24, as shown by arrow B, and the fluid flow changes to the inside diameter side or is disturbed to the left or right of the bumps 24, preventing the laminar flow from generating on the inner surface of the tube, and further breaking the boundary films. Therefore, the heat supplied from the outer surface of the tube to the feedstock fluid on the inner surface is improved in heat transfer efficiency, and the fluid is also prevented from overheating.

According to the thermal cracking tube 10 of the present invention, it heats up the feedstock fluid to the center portion in the radial direction of the tube and quickly raise the feedstock fluid to the thermal reaction temperature range, thus preventing overheating of the fluid and achieving an increased yield of the target product. The prevention of overheating also suppresses coking, which reduces the need for the decoking works and increases the working days to achieve an increased yield.

The above description of the embodiments is to explain the present invention and should not interpret to limit the inventions recited in the claims or restrict the scope thereof. According to the present invention, each of the configurations is not limited to one embodiment described above and can make various modifications to them within the technical scope recited in the claims.

EXAMPLES

First Example

Figure 4:
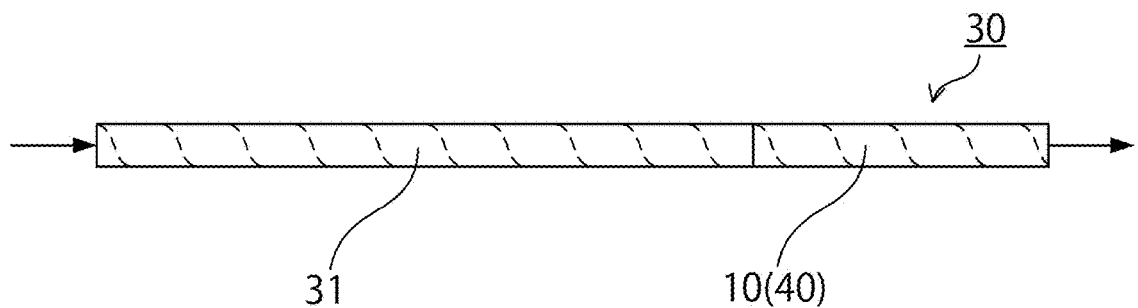
FIG. 4 is an explanation view of the test thermal cracking tube used in EXAMPLES.

As shown in FIG. 4, a test thermal cracking tube 30 prepared is provided on the upstream side with a preheating zone 31 and on the downstream side with a thermal cracking tube 10 of Inventive Example as shown in FIG. 1. A test thermal cracking tube 30 also prepared is provided on the upstream side with a preheating zone 31 and on the downstream side with a thermal cracking tube 40 of Comparative Example. The preheating zone 31 is 1.6 m in length. The thermal cracking tubes 10, 40 are 0.6 m in length and 40 mm in inside diameter. Fluid was introduced into the test tubes to measure the outlet temperature (° C.) of the fluid and the heat exchange amount (kw).

Figure 5:
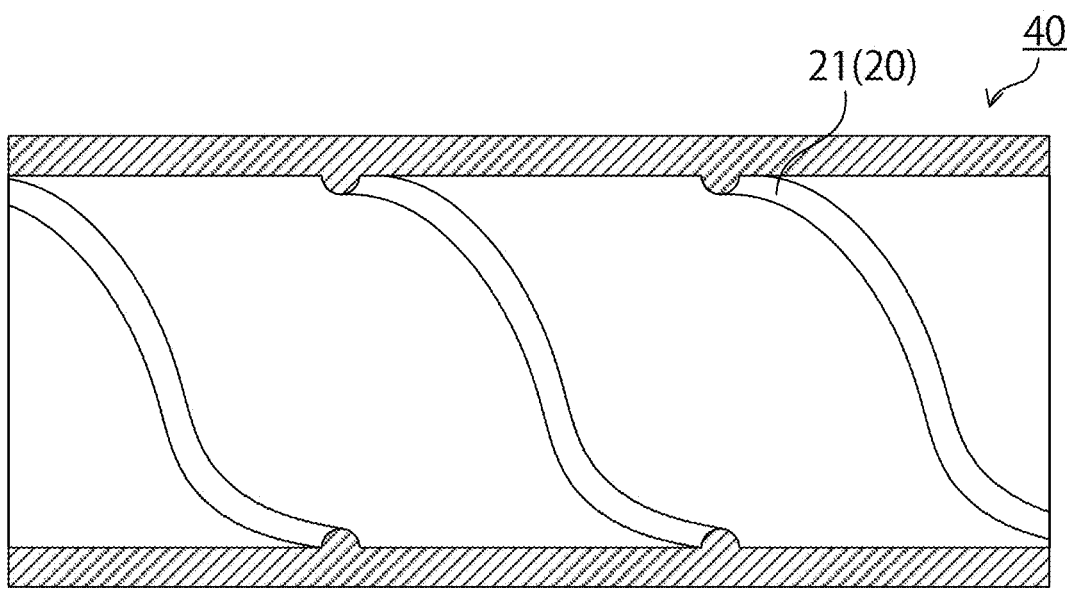
FIG. 5 is a development view of the thermal cracking tube of Comparative Example.

The thermal cracking tube 10 of Inventive Example has a single continuous helical-shaped fin 21 as an agitating element and a plurality of bumps 24 on a region near the fin 21, as shown in FIG. 1. The thermal cracking tube 40 of Comparative Example has a single continuous helically-shaped fin 21 as an agitating element but has no bump 24, as shown in FIG. 5. The helical fin 21 of both Inventive and Comparative Examples has an inclination angle θ of 30 degrees, a height of 2.1 mm, and a width of 7.0 mm. The bumps 24 of Inventive Example are formed in semi-spherical shape by sputtering, and are 2.0 mm in diameter and 1.0 mm in height. The bumps 24 are formed on the region that is 50% of the upstream side from the fin 21 and 50% of the downstream side from the fin 21. These regions are an entire area of the area S where bumps 24 can be formed on the tube inner surface, i.e., an area excluding fin 21. Inventive Example is an embodiment wherein an area S' occupied by bumps 24 on the tube inner surface is 3% of the area S.

The preheating zone 31 on the upstream side of the test thermal cracking tube 30 is provided on its wall portion with insulation. The preheating zone 31 connected with the thermal cracking tube 10 of Inventive Example has a helically-shaped fin 21 and bumps 24 as in the case of the thermal cracking tube 10. The preheating zone 31 that is connected with the thermal cracking tube 40 of Comparative Example has a helically-shaped fin 21 as in the case of the thermal cracking tube 40. The thermal cracking tubes 10 and 40 are heated to a temperature of 1000° C. on the wall surface and held at this temperature.

The feedstock fluid consisting of 70 wt. % of ethane and 30 wt. % of water vapor was introduced into the test tube 30 that was heated at a constant temperature of 1000° C. on the tube wall surface. The incoming mass flow amount supplied from the fluid is 0.2104 kg/s. The temperature of the fluid is elevated to 700° C. The result is shown in Table 1.

TABLE 1

|  | Outlet Temp. | Heat Exchange Amount |
| --- | --- | --- |
| Inventive Example | 723.9° C. | 17.7 kw |
| Comparative Example | 723.5° C. | 17.4 kw |

Referring to Table 1, the Inventive Example improves in both the outlet temperature and the heat exchange amount compared to the Comparative Example. The reason is considered that Inventive Example has bumps 24 provided on the inner surface of the tube as shown by arrow B in FIGS. 1 and 2, in addition to the fin 21 as the agitating element 20. As a result, the fluid collides with bumps 24, as shown by arrow B in FIGS. 1 and 2, and the fluid flow is brought into turbulence to prevent the laminar flow from generating on the inner surface of the tube, thus breaking the boundary films and increasing the heat transfer efficiency. Thus, the thermal cracking tube 10 of Inventive Example can achieve an increase of the yield compared to the thermal cracking tube 40 of Comparative Example.

Second Example

Figure 6:
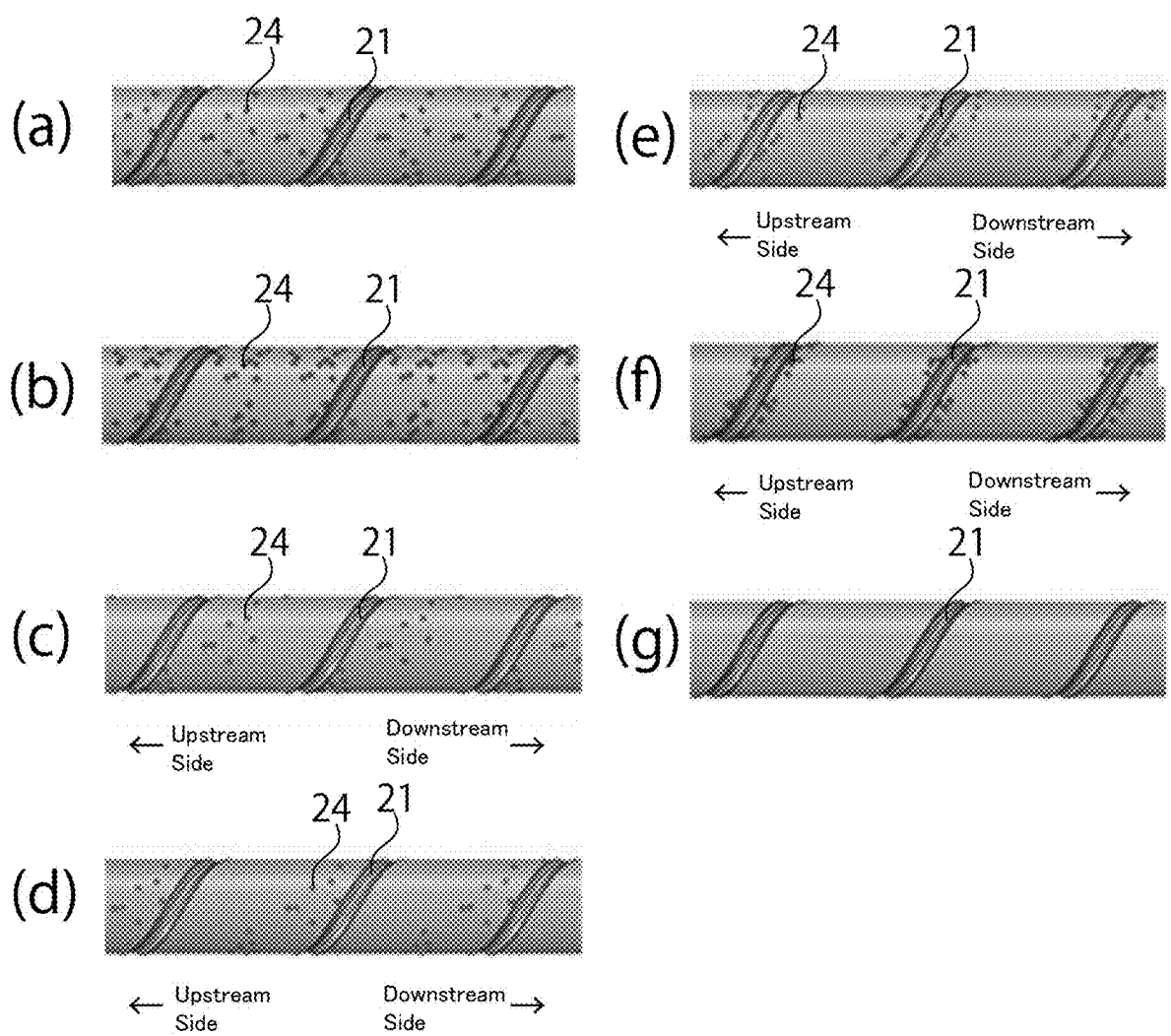
FIG. 6 is sectional views of the thermal cracking tube used in the Second Example wherein (a) to (f) are Inventive Examples and (g) is a Comparative Example.

Inventive Examples 1-6 are shown in FIGS. 6 (a)-6 (f), respectively, where the test tubes are formed on the inner surface thereof with bumps 24 on the region near the fin 21. The test tubes of Comparative Examples 1 and 2, as shown in FIG. 6 (g), are formed on the inner surface thereof with only the fin 21. Air was introduced into these test tubes. The outlet temperature (° C.), pressure loss (Pa), and heat transfer coefficient (W/m$^2$K) of the fluid were measured.

The fin 21 of the Inventive and Comparative Examples are helically-shaped and have inclination angle θ of 30° and a width of 7.0 mm. The height of the fin 21 is 2.1 mm for Inventive Examples 1-6 and Comparative Example 1, and 1.5 mm for Comparative Example 2.

The test tubes of Inventive Examples have hemispherically-shaped bumps formed by sputtering and is 2.0 mm in diameter and 1.0 mm in height. Table 2 shows the results. In Table 2, "Bump-formed Region" indicates the position of region where bumps 24 were formed and the area percentages of the region. "S'/S" is the area S' of bumps 24 relative to the area S (i.e., an area excluding the fin 21). "Numbers of Bumps" indicates the number of bumps 24 formed on the inner surface of the tube. "Figure" indicates the corresponding sectional drawing showing the shape of the bump 24, wherein FIG. 6 is a sectional view of a part of the thermal cracking tube.

TABLE 2

|  | Bump-formed Region | S'/S | Numbers of Bumps | FIG. |
| --- | --- | --- | --- | --- |
| Inven. Ex. 1 | Entire area (random location) | 2% | 351 | FIG. 6(a) |
| Inven. Ex. 2 | Entire area (random location) | 3% | 533 | FIG. 6(b) |
| Inven. Ex. 3 | 50 area % on fin's downstream side | 1% | 175 | FIG. 6(c) |
| Inven. Ex. 4 | 50 area % on fin's upstream side | 1% | 176 | FIG. 6(d) |
| Inven. Ex. 5 | 10 area % on fin's upstream side & 10 area % on fin's downstream side | 2% | 356 | FIG. 6(e) |
| Inven. Ex. 6 | 5 area % on fin's upstream side & 5 area % on fin's downstream side | 2% | 352 | FIG. 6(f) |
| Compar. Ex. 1 | None | 0% |  | FIG. 6(g) |
| Compar. Ex. 1 | None | 0% |  | FIG. 6(g) |

The Inventive and Comparative Examples were heated at 156° C. on the wall of each thermal cracking tube. The fluid used in these Examples is an air at a temperature of 32.54° C., and the incoming mass flow amount is 0.055 kg/s. The results of the Inventive and Comparative Examples are shown in Table 3. FIG. 7 is a graph wherein the pressure loss and the heat transfer coefficient are plotted, showing the pressure loss on the horizontal axis and the heat transfer coefficient on the vertical axis.

TABLE 3

|  | Outlet Temperature (° C.) | Pressure Loss (Pa) | Heat Transfer Coefficient (W/m$^2$K) |
| --- | --- | --- | --- |
| Inven. Ex. 1 | 55.9 | 636 | 162 |
| Inven. Ex. 2 | 55.7 | 635 | 151 |
| Inven. Ex. 3 | 54.5 | 562 | 142 |
| Inven. Ex. 4 | 54.9 | 581 | 148 |
| Inven. Ex. 5 | 55.3 | 599 | 151 |
| Inven. Ex. 6 | 55.8 | 616 | 152 |
| Compar. Ex. 1 | 54.0 | 531 | 135 |
| Compar. Ex. 1 | 52.5 | 393 | 126 |

Referring to Table 3, it can be seen that, as in the First Example, the outlet temperature of the fluid is higher in all the Inventive Examples than in the Comparative Examples. In addition, referring to FIG. 7, the Inventive Examples are all plotted on the upper side of the trendline connecting Comparative Examples 1 and 2, and the trendline of the Inventive Examples has a greater slope than the trendline of the Comparative Examples. This means that the heat transfer coefficient improved compared to the increase in pressure loss.

When comparing the Inventive Examples to each other, Inventive Example 1, wherein the bumps 24 are randomly distributed over the entire surface of the inner surface of the tube, has the most improvement in heat transfer coefficient and the highest fluid outlet temperature. Inventive Example 2 has bumps 24 which are more closely arranged than the Inventive Example 1 was lower with respect to the outlet temperature than the Inventive Example 1. Inventive Example 4 might have caused a turbulence due to the bumps 24.

Inventive Examples 3 and 4 are examples wherein bumps 24 are formed in the downstream and upstream I/2 regions, respectively, relative to the spacing I between fins 21 (see FIG. 1). A comparison with Inventive Examples 3 and 4 shows that Inventive Example 4 having bumps 24 on the upstream had a higher outlet temperature and a larger heat transfer coefficient than Inventive Example 3 having bumps 24 on the downstream. This effect is considered because bumps 24 agitated the fluid going toward the fin 21 and suppressed the generation of laminar flow near the fin 21.

Inventive Examples 5 and 6 are examples wherein bumps 24 are formed in the upstream I/10 region and downstream I/20 region, respectively, relative to the spacing I between the fin 21. Inventive Example 5 has a Bump-formed Region of the bumps 24 twice Inventive Example 6 and the number of bumps 24 almost the same as Inventive Example 6. In other words, the density of bumps 24 in Inventive Example 6 is about twice as high as that in Inventive Example 5. The outlet temperature of Inventive Example 6 is higher than that of Inventive Example 5. This result shows that when the number of bumps 24 are the same on the upstream and downstream sides of the fin 21, the outlet temperature becomes higher by providing more bumps 24 near the fin 21.

DESCRIPTION OF REFERENCE SIGNS

10 Thermal cracking tube
20 Agitating element
21 Fin
24 Bump

The invention claimed is:

1. A thermal cracking tube having one or more fluid agitating elements formed on and projecting inwardly from an inner surface of the tube,
the one or more fluid agitating elements comprising
a fin extending along the inner surface of the tube, and
bumps provided on a region near the fin and projecting inwardly from the inner surface of the tube, wherein
the fin comprises a plurality of fins formed on the inner surface of the tube at an interval of I, and
the bumps are provided on the region at least up to I/2 of the upstream side and/or I/2 of the downstream side of the fin.

2. The thermal cracking tube having one or more fluid agitating elements according to claim 1 wherein
the bumps are provided on the region at least up to I/3 of the upstream side and/or I/3 of the downstream side of the fin.

3. The thermal cracking tube having one or more fluid agitating elements according to claim 1 wherein
the region near the fin includes an upstream side and/or a downstream side of the fin in the direction of the fluid flowing through the tube.

4. The thermal cracking tube having one or more fluid agitating elements according to claim 1 wherein
the bumps are not constant in height and/or size.

5. The thermal cracking tube having one or more fluid agitating elements according to claim 1 wherein
the height H1 of the fin is higher than the height H2 of the bumps.

6. A thermal cracking tube having one or more fluid agitating elements formed on and projecting inwardly from an inner surface of the tube,
the one or more fluid agitating elements comprising
a fin extending along the inner surface of the tube, and
bumps provided on a region near the fin and projecting inwardly from the inner surface of the tube, wherein
an area S excluding the fin on the tube inner surface is at least twice larger than an area S' occupied by the bumps on the tube inner surface.

7. The thermal cracking tube having one or more fluid agitating elements according to claim 1 wherein
the bumps are point-like protrusions projecting inwardly from the inner surface of the tube.

8. The thermal cracking tube having one or more fluid agitating elements according to claim 1 wherein
the bumps are formed at least on the downstream side of the fin.

9. The thermal cracking tube having one or more fluid agitating elements according to claim 1 wherein
the fin is formed helically relative to an axis of the tube.

10. The thermal cracking tube having one or more fluid agitating elements according to claim 1 wherein
an area S excluding the fin on the tube inner surface is at least twice larger than an area S' occupied by the bumps on the tube inner surface.

* * * * *